R. WAGNER.
CONVEYER FOR INCANDESCENT MATERIALS.
APPLICATION FILED FEB. 13, 1909.
983,586.
Patented Feb. 7, 1911.
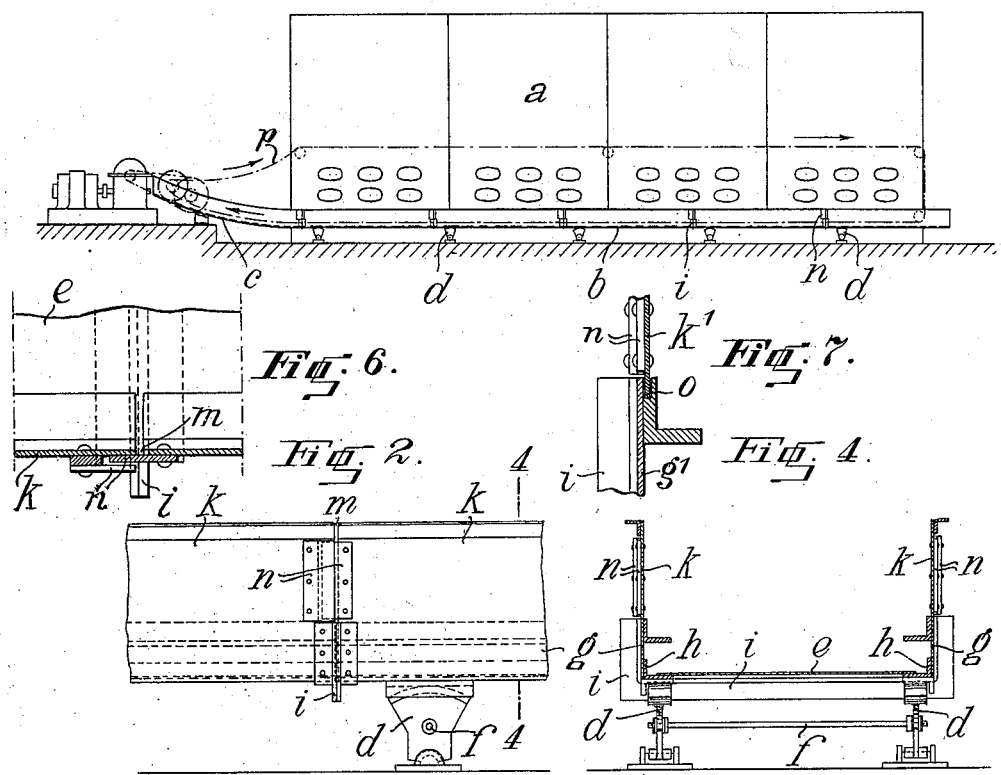
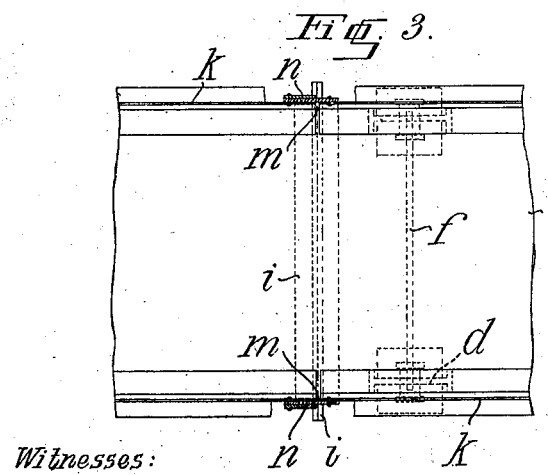
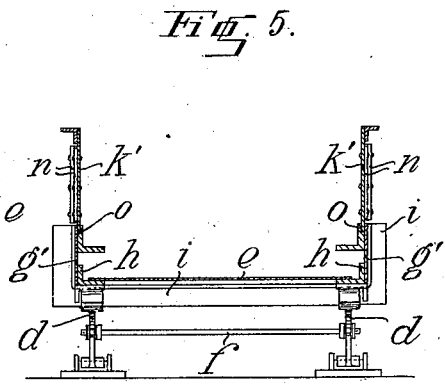
Witnesses:
John Lotka
John A. Stehlenker
Inventor
Reinhold Wagner
by Briesen & Knauth
Attorneys
THE NORRIS PETERS CO., WASHINGTON, D. C.

UNITED STATES PATENT OFFICE.

REINHOLD WAGNER, OF BERLIN, GERMANY.

CONVEYER FOR INCANDESCENT MATERIALS.

983,586.

Specification of Letters Patent.

Patented Feb. 7, 1911.

Application filed February 13, 1909. Serial No. 477,509.

*To all whom it may concern:*

Be it known that I, REINHOLD WAGNER, a subject of the Emperor of Germany, and resident of Berlin, Germany, have invented certain new and useful Improvements in Conveyers for Incandescent Materials, of which the following is a specification.

My invention relates to troughs or like devices for conveying incandescent materials, for instance coke. When such a trough is constructed of sheet metal, the different parts of the trough are exposed to a largely varying expansion and contraction as the incandescent material is put on the conveyer and removed therefrom, and also when cold water is sprayed on the incandescent material and collects in the lower portion of the trough; and it is the purpose of my present invention so to construct the conveyer that the upper portion of the trough may expand and contract independently of the bottom of the trough, without impairing the efficiency and changing the form of the trough.

In the accompanying drawings I have illustrated two forms of construction embodying my invention.

Figure 1 being a diagrammatic side elevation showing one form of my invention; Fig. 2 is a partial side elevation drawn upon an enlarged scale; Fig. 3 is a corresponding plan view with parts in section; Fig. 4 is a vertical section on line A—B of Fig. 2 and Fig. 5 is a corresponding view of another form of my invention; Fig. 6 is an enlarged plan view, partly in section, of the expansion joint shown in Fig. 3; and Fig. 7 is an enlarged vertical section of the joint shown in Fig. 5.

In Figs. 1 to 4 the trough, which is provided with suitable devices (not shown) for spraying water on the incandescent material, consists of a horizontal portion *b* extending transversely in front of the retorts *a* and an inclined or rising portion *c*. The incandescent material is fed by any suitable device such as the conveyer chain *p*, indicated by dotted lines in Fig. 1. The rising portion *c* is firmly anchored or fastened but the main portion *b* of the conveyer is so supported as to be capable of movement in the direction of its length. For this purpose the body portion *b* may be supported on balls or rollers, or, as shown in Figs. 1, 2 and 4 on rocking bearings *d*, which engage the bottom *e* of the trough on both sides and are connected in pairs by rods *f*. The bottom *e* is rigidly connected with the lower portions *g* of the side walls, for instance by means of angle irons *h*. U-shaped cross pieces *i* are located at intervals to strengthen said bottom. The upper portions of the side walls are generally exposed to a greater heat from the incandescent material than the bottom, which is cooled by the water, and for this reason I have adopted a special construction for the upper part of the side walls, these upper portions consisting of individual plates *k*, which are separated by intervals as shown at *m* in Figs. 2 and 3 and are connected by bridging plates or fish plates *n*, (shown in enlarged view in Fig. 6) so that a considerable expansion and contraction of the plates *k* is allowed.

In the construction illustrated by Fig. 5 the upper portions *k'* of the side walls are not connected rigidly with the lower portions *g'*, but the side walls are divided not only vertically as in Fig. 2, but also horizontally or lengthwise. The upper portions *k'* have lower edges *o* fitting loosely into grooves of the lower trough body and are suitably held in this position, as shown in Fig. 7. In this construction the upper portions *k'* of the side walls may move independently of the lower portion of the trough which portion is supported by the tilting bearings *d* and embraces the bottom *e* and the lower side wall portions *g'*. I thus secure a further protection against the trough's changing its form under the influence of unequal temperature variations. The lower side wall portions *g* or *g'* should preferably extend to about the highest level which the water assumes in the trough in the ordinary operation.

I claim as my invention:

1. A trough for receiving and conveying hot material such as incandescent coke, having side walls of upper and lower portions, the upper side wall portions being provided with vertical slots to allow for the expansion and contraction thereof independently of the lower side wall portions.

2. A trough for receiving and conveying hot material such as incandescent coke, the lower portion of which is supported to permit longitudinal movement thereof and the upper side wall portions of which are provided with vertical slots to allow for the expansion and contraction of said portions independently of the lower portion.

3. A trough for receiving and conveying hot material such as incandescent coke, the side walls of which are divided lengthwise and have their upper parts provided with vertical slots to allow for lengthwise movement of the upper side wall portions independently of the lower side wall portions.

4. A trough for receiving and conveying hot material such as incandescent coke, the lower portion of which rests on supports allowing for a longitudinal movement and the side walls of which are divided lengthwise and have their upper parts provided with vertical slots to allow for a lengthwise movement of the upper side wall portions independently of the lower side wall portions.

5. A trough for receiving and conveying hot material such as incandescent coke having a lower portion provided with grooves at its edges and having side plates slidably mounted in said grooves.

6. A trough for receiving and conveying hot material such as incandescent coke having a lower portion provided with grooves at its edges and having side plates spaced apart from one another slidably mounted in said grooves.

7. A trough for receiving and conveying hot material such as incandescent coke having a lower portion and side portions, such side portions each comprising a plurality of elements, such elements being movably connected with each other.

8. A trough for receiving and conveying hot material such as incandescent coke having a lower portion and side portions, such side portions each comprising a plurality of elements, such elements being movably connected with each other and with the lower portion.

In witness whereof I have hereunto set my hand and seal in the presence of two subscribing witnesses.

REINHOLD WAGNER. [L. S.]

Witnesses:
    OTTO KÖNIG,
    PAUL RANKE.